US012760641B2

(12) United States Patent
Badrinarayanan

(10) Patent No.: US 12,760,641 B2
(45) Date of Patent: Oct. 13, 2026

(54) ENCODING DATA ACROSS DIFFERENT DOWNLINK CHANNELS

(71) Applicant: Halliburton Energy Services, Inc., Houston, TX (US)

(72) Inventor: Paravastu Badrinarayanan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 268 days.

(21) Appl. No.: 18/189,803

(22) Filed: Mar. 24, 2023

(65) Prior Publication Data

US 2024/0318548 A1 Sep. 26, 2024

(51) Int. Cl.
*E21B 47/18* (2012.01)
*E21B 44/00* (2006.01)
*H04B 13/02* (2006.01)

(52) U.S. Cl.
CPC .............. *E21B 47/18* (2013.01); *E21B 44/00* (2013.01); *H04B 13/02* (2013.01)

(58) Field of Classification Search
CPC .......... E21B 47/18; E21B 44/00; E21B 47/20; H04B 13/02
See application file for complete search history.

(56) References Cited

U.S. PATENT DOCUMENTS 6,948,572 B2 9/2005 Hay et al.
7,222,681 B2 5/2007 Jones et al.
7,245,229 B2 * 7/2007 Baron .................. G01V 11/002 702/9
7,518,950 B2 * 4/2009 Treviranus .............. E21B 47/18 340/854.3
7,983,113 B2 * 7/2011 Krueger .................. E21B 47/18 340/854.3
9,488,045 B2 * 11/2016 Clausen .................. E21B 47/12
10,597,960 B2 * 3/2020 Solem ..................... E21B 23/00
2006/0185900 A1 * 8/2006 Jones ...................... E21B 47/12 175/45
2007/0230614 A1 * 10/2007 Walker .................... H03M 5/14 341/51
2013/0093597 A1 * 4/2013 Stolpman ................. G01V 3/18 340/854.3
2016/0227298 A1 * 8/2016 White .................. H04L 7/0008

FOREIGN PATENT DOCUMENTS

WO 03069120 8/2003
WO 2005048459 5/2005
WO 2014094150 6/2014

OTHER PUBLICATIONS

"PCT Application No. PCT/US2023/065010, International Search Report and Written Opinion", Dec. 13, 2023, 10 pages.

* cited by examiner

*Primary Examiner* — Amine Benlagsir
(74) *Attorney, Agent, or Firm* — DeLizio, Peacock, Lewin and Guerra, LLP

(57) ABSTRACT

Some implementations include a method for transmitting encoded information via operations of drilling equipment in a drilling system comprises. The method may include emitting, via a first device, a first signal indicating first encoded information. The method may include determining a relationship between a first aspect of the first signal and a second aspect of a second signal, the relationship indicating second encoded information. The method may include emitting, via a second device, the second signal in relation to the first signal so the first and second aspects exhibit the relationship.

17 Claims, 6 Drawing Sheets

ENCODING DATA ACROSS DIFFERENT DOWNLINK CHANNELS

TECHNICAL FIELD

The disclosure generally relates to the field of equipment utilized and operations performed in drilling and operating subterranean wells and more specifically to increasing physical downlink data rates by encoding data across multiple different downlink channels.

BACKGROUND

To achieve greater drilling automation via a rotary steerable system, sending data such as depth and other parameters to one or more downhole tools at frequent intervals is necessary. With the current downlinking approaches such as negative pressures, or manual rotary of flow commands, the data rate/density may not be sufficient for sending large amounts of data needed to achieve better automation. Hence, there is a need for better methodologies for exchanging data between components of automated drilling systems.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, this disclosure may be practiced without these specific details. For clarity, some well-known instruction instances, protocols, structures, and techniques may not be shown in detail.

Overview

Some implementations of the inventive subject matter relate to methodologies for downlink telemetry in a drilling system. Some implementations may simultaneously utilize traditional downlinking methods to encode data in downlinking signals. Traditional downlink signaling methods include pressure signaling (e.g., negative pressure pulses in the mud column generated via a controlled bypass valve on surface), rotary commands via a top drive (e.g., signals that may include pulsing between higher revolutions per minute (RPM) and a lower RPM), and downhole generator turbine RPM signaling that may include changes controlled by a flow rate of mud pumps on surface (i.e. sequences of a higher flow rate and a lower flow rate). Some implementations utilize traditional downlink signaling methods to transmit signals downhole. Information may be encoded in downlink signals based on time differences between pulses in the downlink signals. For example, a system may generate two signals using two downlinking methods such as negative pressure pulse signaling and rotary tool RPM signaling. Each signal itself may create a data stream including information destined for downhole components. An additional data stream may be created based on timing relationships across the two signals. For example, timing between a pulse of the first signal by a downlink method and a pulse of the second signal by another downlink method may represent another data stream with which additional data may be transmitted to downhole components. By increasing downlinking throughput, drilling systems may achieve better drilling automation for rotary steerable systems and other downhole systems.

Some Example Implementations

Figure 1:
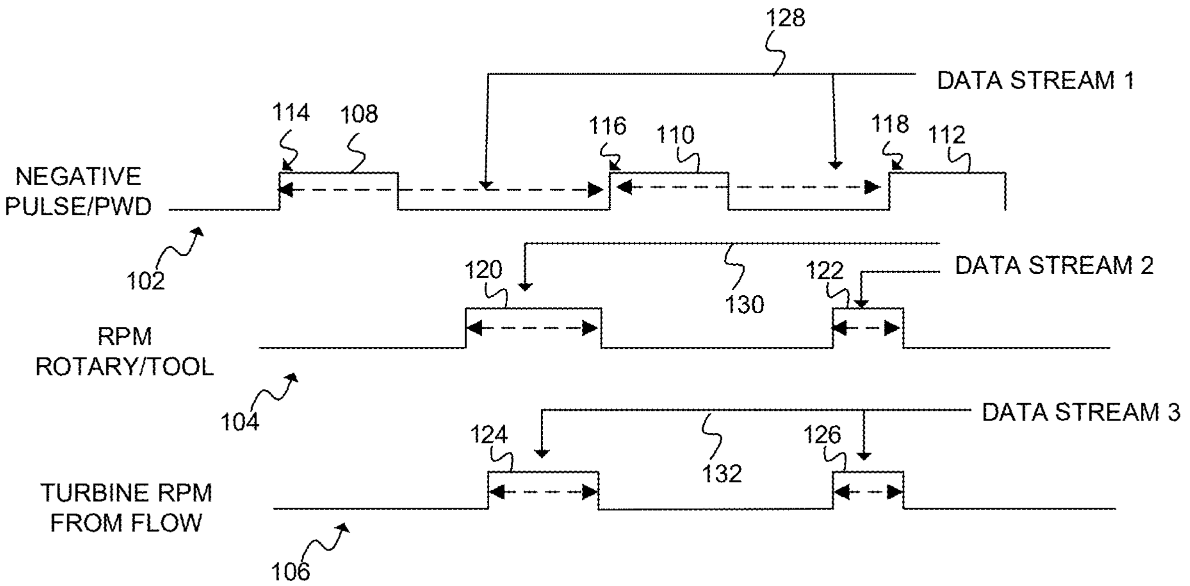
FIG. 1 is diagrammatic illustration of three signals and three data streams in a drilling system.

FIG. 1 is diagrammatic illustration of three signals and three data streams in a drilling system. FIG. 1 shows a negative pressure signal 102, an RPM rotary signal 104, and a turbine RPM signal 106.

The negative pressure signal 102 may include a sequence of pulses. As an example, three pulses 108, 110, and 112 are shown, but any number of pulses may be included in the negative pressure signal 102. A mud system (also referred to as a drilling fluid system) may generate signals, such as negative pressure pulses 108, 110, and 112 by opening a value at the surface (further described below). For case of illustration, the pulses 108, 110, and 112 are shown as having a positive pressure step-up instead of a negative pressure step-down. Each of the pulses 108, 110, and 112 includes a leading edge. More specifically, the pulse 108 includes a leading edge 114. The pulse 110 includes a leading edge 116, and the pulse 112 includes a leading edge 118. Elapsed time between the leading edges 114, 116, and 118 may create a first data stream 128. For example, time durations between the leading edges 114, 116, and 118 may contain encoded data such as drill bit depth, drill bit steering information, other drilling parameters, or any information useful in an automated drilling process. Data in the first data stream 128 may be encoded using any suitable encoding methodology. In some implementations, the negative pressure signal 102 may encode data in a mud pulse system via differential pulse position modulation (DPPM). In some implementations, the negative pressure signal 102 may encode data according to any of the phase shift keying (PSK) methodologies, such as binary PSK, quadrature PSK, and others. In some embodiments, instead of creating the signal 102 via negative pressure in a mud system, an electromagnetic transmitter may generate the signal 102 and the pulses 108, 110, and 112.

For the RPM rotary signal 104, information may be encoded in the pulse width of a pulse sequence that includes a pulse 120 and a pulse 122. The pulses described herein may include a signature indicative of when the signal amplitude varies from a baseline and may be generated by any component of the drilling system (such as the mechanical tools described with respect to FIG. 1). In the RPM rotary signal 104, the pulses 120 and 122 may be generated by an increase in RPMs of a rotary table (at the surface) attached to the drill string. The information encoded in the RPM rotary signal may create a second data stream 130. In the RPM rotary signal 104, a minimum pulse distance may be maintained, where the pulse distance may refer to a time duration between leading edges. The RPM rotary signal 104 may use any suitable technique for encoding information based on its pulse width and/or pulse sequence.

In the turbine RPM signal 106, the information may be encoded in the pulse width of the pulse sequence that includes pulse 124 and pulse 126. The pulses 124 and 126 may be generated by an increase or decrease in the RPMs of a downhole turbine such as a generator turbine that converts mud flow into rotational force and electrical energy. The information encoded in the turbine RPM signal creates a third data stream 132. In the turbine RPM signal 106, a minimum pulse distance may be maintained. The turbine RPM signal 106 may use any suitable technique for encoding information based on its pulse width and/or pulse sequence.

In some implementations, one or more of the signals 102, 104, and 106 may out-of-band from one or more of the others. Additionally, the signals 102, 104, and 106 may be out-of-band with any signals used for uplink communications between downhole components and surface components.

Each of the signals 102, 104, and 106 may include one or more square wave pulses that move between discrete levels of amplitude. In FIG. 1, the signals move between two levels of amplitude. However, in some implementations, one or more of signals may move between two or more levels of amplitude. The levels of amplitude may include any suitable amplitude level achieved by any suitable device in a drilling system. For example, a first amplitude level may coincide with a first flow level of mud (also referred to as drilling fluid) in a mud system (also referred to as a drilling fluid system) and a second amplitude level may coincide with a second flow level of the mud. As another example the discrete amplitudes may coincide with RPM levels of rotary components or RPM levels of mud-flow-based components. In some implementations, none of the signals 102, 104, and 106 are electrical signals but are instead produced via mechanical operation of components in the drilling system, such as by mechanical operations of a mud pulse system, rotary tool, turbine, or other component.

The signals 102, 104, and 106 may not be drawn to scale. For example, the pulses 108, 110, and 112 of the negative pressure signal 102 may have very short duration. In some implementations, the negative pressure signal 102 may include pulses lasting milliseconds whereas pulses of other signals may be much longer. Similarly, the relative scale and other aspects of the signals 102, 104, and 106 may be different than shown herein. For example, pulses may not have the rectangular shape shown in FIG. 1 but instead may be any suitable shape (such as any shape that shows a deviation from a baseline).

The signals described herein may be perceived by any suitable downhole devices. For example, a pressure transducer may receive, measure, characterize, decode, or otherwise detect pressure pulses. A magnetometer or gyroscope may receive, measure, characterize, decode, or otherwise detect RPM signals. A flow decoder may receive, measure, characterize, decode, or otherwise detect a flow signal from a turbine. An antenna may receive, measure, characterize, decode, or otherwise detect EM signals.

In FIG. 1, the signals 102, 104, and 106 facilitate three independent data streams 128, 130, and 132 that transmit encoded information in a wellbore. Some implementations provide methods by which the signals 102, 104, and 106 may facilitate two additional data steams without using additional signals. For example, the signals 102, 104, and 106 may encode information in five data streams. More details are discussed with reference to FIG. 2.

Figure 2:
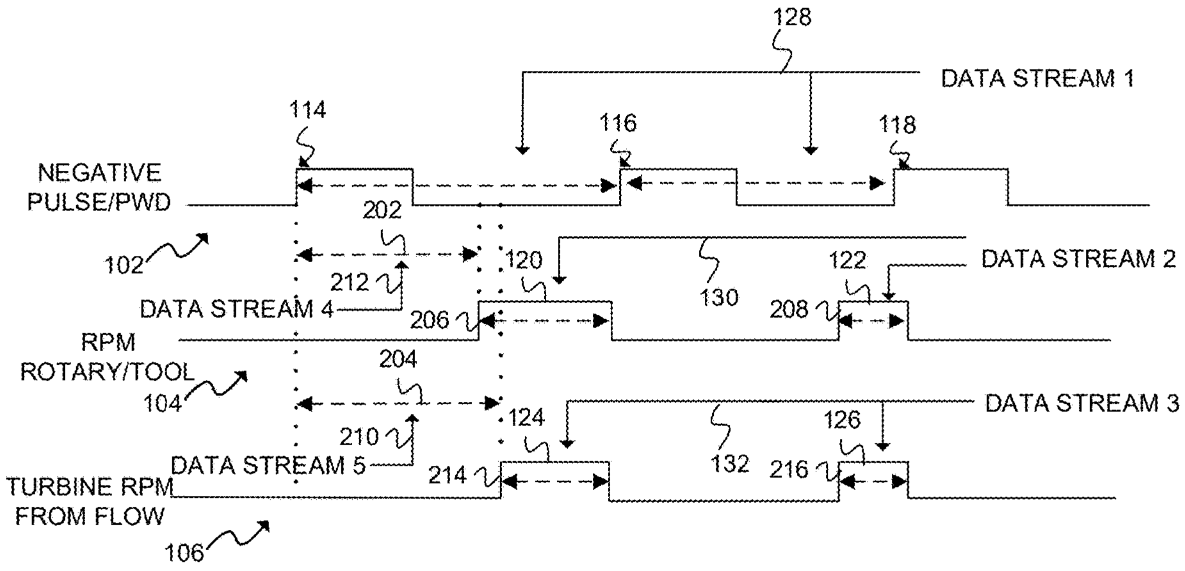
FIG. 2 is a diagrammatic illustration of three signals and five data streams in a drilling system.

FIG. 2 is a diagrammatic illustration of three signals and five data streams in a drilling system. FIG. 2 shows the negative pressure signal 102, the RPM rotary signal 104, and the turbine RPM signal 106. Some implementations utilize additional encoding methods to achieve additional data streams without additional signals. For example, some implementations may achieve two additional data streams (five total data streams) based on the three signals 102, 104, and 106. Hence, some implementations simultaneously support five data streams 128, 130, 132, 210, and 212 based on the three signals 102, 104, and 106.

As shown in FIG. 2, some implementations may establish the fourth data stream 212 via timing between leading edges 114, 116, and 118 of the negative pressure signal 102 and leading edges 206 and 208 of the RPM rotary signal 104. For example, information may be encoded based on a time duration 202 between the leading edge 114 and the leading edge 206. The fourth data stream 212 may include additional encoded information by repeating the process for additional leading edges, such as by encoding information based on durations between the leading edge 116 and leading edge 208, and so on.

As shown in FIG. 2, some implementations may establish the fifth data stream 210 via timing between leading edges 114, 116, and 118 of the negative pressure signal 102 and leading edges 214 and 216 of the turbine RPM signal 106. For example, information may be encoded based on a time duration 204 between the leading edge 114 and the leading edge 214. The fifth data stream 210 may include additional encoded information by repeating the process for additional leading edges, such as by encoding information based on time durations between the leading edge 116 and leading edge 216, and so on.

Therefore, some implementations enable three signals to simultaneously carry five data streams 128, 130, 132, 210, and 212. However, some implementations may utilize only two signals to simultaneously carry three data streams. Some implementations may add more data streams by adding more signals and synchronizing aspects of the additional signals (such as leading edges) with aspects (such as leading edges) of the signals 102, 104, and 106. Hence, some implementations may utilize any number of signals to achieve one additional data streams.

Figure 3:
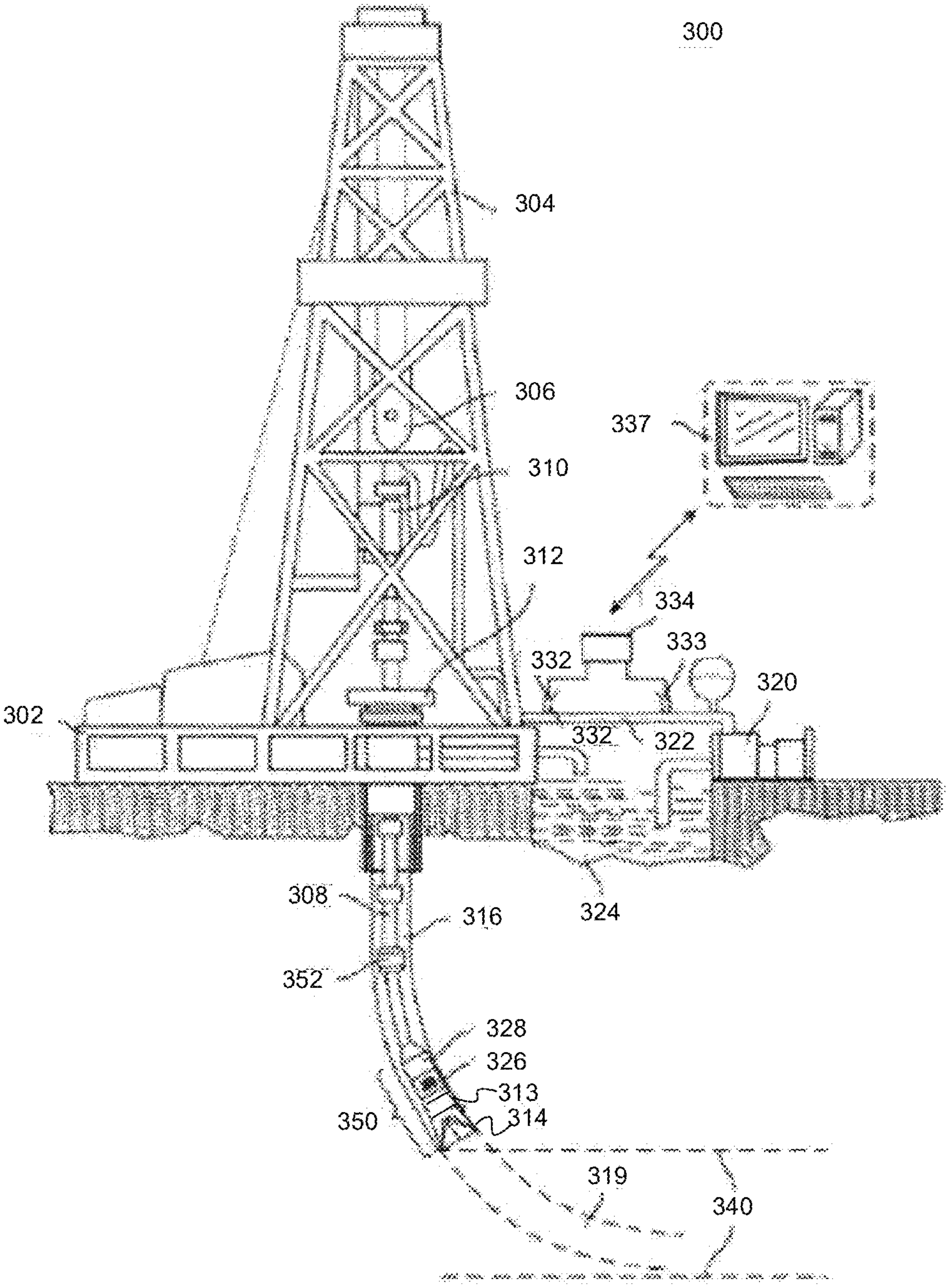
FIG. 3 is a schematic diagram of a directional drilling environment.

FIG. 3 is a schematic diagram of a drilling environment. As depicted, a drilling system 300 may include a drilling platform 302 having a derrick 304 and a hoist 306 to raise and lower a drill string 308. The hoist 306 may suspend a top drive 310 suitable for rotating drill string 308 and lowering drill string 308 through a well head 342. Notably, the drill string 308 may include sensors or other instrumentation for detecting and logging nearby characteristics and conditions of the wellbore and surrounding earth formation.

In operation, the top drive 310 supports and rotates drill string 308 as it is lowered through well head 312. In this fashion, drill string 308 (and/or a downhole motor) may rotate a drill bit 314 coupled with a lower end of drill string 308 to create a wellbore 316 through various formations. The top drive 310 may change RPM speeds to generate pulses, such as the pulses 120 and 122 of FIG. 1. The top drive 310 may be controlled by any suitable techniques and components so that control may be automated and synchronized to generate pulses and to coordinate with other signaling components as described herein. In some implementations, a rotary table (not shown) (instead of the top drive 310) may produce the rotational force that rotates the drill string 308. The rotary table may be similarly controlled to generate pulses and coordinate with other signaling components.

A pump 320 may circulate drilling fluid through a supply pipe 322 to top drive 310, down through an interior of drill string 308, through orifices in drill bit 314, back to the surface via an annulus around drill string 308, and into a retention pit 324. The drilling fluid may transport cuttings from wellbore 316 into the retention pit 324 and helps maintain wellbore integrity. Various materials may be used for drilling fluid, including oil-based fluids and water-based fluids. The pump 320 may increase or decrease flow of drilling fluid to increase or decrease RPMs of a downhole generator turbine 313. In some instances, the generator turbine 313 may generate pulses (such as pulses 124 and 126 shown in FIG. 1) by increasing (or decreasing) RPM from a baseline for a time duration. Such pulses may be used for downlink telemetry and may be coordinated with signals from other signaling devices as described herein.

As shown, the drill bit 314 may form part of a bottom hole assembly 350, which further includes drill collars (e.g., thick-walled steel pipe) that provide weight and rigidity to aid drilling processes. Detection tools 326 and a telemetry subsystem 328 may be coupled to or integrated with one or more drilling collars.

One or more valves 333 in the drilling fluid plumbing (such as supply pipe 322) may open and close to create negative pressure pulses (such as the negative pressure pulses 108, 110, and 112 shown in FIG. 1) detectable by one or more downhole components (such as the telemetry subsystem 328). The pressure pulses may have any suitable pulse width as described with reference to FIGS. 1 and 2. The valves 333 may be controlled by any suitable techniques and components so that control may be automated and synchronized with other signaling techniques as described herein.

Detection tools 326 may gather MWD survey data or other data and may include various types of electronic sensors, transmitters, receivers, hardware, software, and/or additional interface circuitry for generating, transmitting, and detecting signals (e.g., sonic waves, etc.), storing information (e.g., log data), communicating with additional equipment (e.g., surface equipment, processors, memory, clocks input/output circuitry, etc.), and the like. In particular, detection tools 326 may measure data such as position, orientation, weight-on-bit, strains, movements, borehole diameter, resistivity, drilling tool orientation, which may be specified in terms of a tool face angle (rotational orientation), and inclination angle (the slope), and compass direction, each of which may be derived from measurements by sensors (e.g., magnetometers, inclinometers, and/or accelerometers, though other sensor types such as gyroscopes, etc.).

The telemetry subsystem 328 may receive downlink telemetry information from surface equipment. For example, the telemetry subsystem 328 may include components (such as one or more transducers) that convert downlink telemetry signals into information useful by components of in the drill string. For example, the telemetry subsystem 328 may receive the signals 102, 104, and 106 that include the data streams 128, 130, 132, 210, and 212. As noted, the data streams include encoded information indicating drilling parameters (such as drilling speed, drilling direction, etc.), telemetry modes, and any other suitable information useful to components in the drill string such as controller 352 (described below). The telemetry subsystem 328 may decode information encoded in the signals 102, 104, and 106 by utilizing above-described relationships between the pulses (such as the timing between the various leading edges). With the benefit of this disclosure, one of ordinary skill in the art would understand the process by which the telemetry subsystem 328 utilizes relationships between the signals 102, 104, and 106 to generate information in each of the data streams 128, 130, and 132, 210, and 212. The telemetry subsystem 328 may further decode information in the data streams 128, 130, and 132, 210, and 212 to obtain drilling information, telemetry information, and/or any other information useful to downhole components of the drilling system 300.

The telemetry subsystem 328 also may include a transmitter for uplink telemetry, where the transmitter may modulate resistance of drilling fluid flow thereby generating pressure pulses that propagate along the fluid stream at the speed of sound to the surface. One or more pressure transducers 332 may operatively convert the pressure pulses into electrical signal(s) for a signal digitizer 334. Other forms of telemetry such as acoustic, electromagnetic, telemetry via wired drill pipe, etc. may also be used to communicate signals between downhole drilling tools and signal digitizer 334. Further, the telemetry subsystem 328 may store detected and logged data for later retrieval at the surface when bottom hole assembly 350 is recovered.

The signal digitizer 334 may convert pressure pulses into a digital signal and send the digital signal over a communication link to a computer system 337 or some other form of a data processing device. In at least some embodiments, computer system 337 includes processing units to analyze collected data and/or perform other operations by executing software or instructions obtained from a local or remote non-transitory computer-readable medium. As shown, computer system 337 may include input device(s) (e.g., a keyboard, mouse, touchpad, etc.) as well as output device(s) (e.g., monitors, printers, etc.). These input/output devices provide a user interface that enables an operator to interact and communicate with the bottom hole assembly 350, surface/downhole directional drilling components, and/or software executed by a computer system 337.

The computer system 337 may include one or more components for generating and coordinating downlink signaling via one or more components of the drilling system 300. Additionally, the computer system 337 may enable an operator to select or program directional drilling options, review or adjust types of data collected, modify values derived from the collected data (e.g., measured bit position, estimated bit position, bit force, bit force disturbance, rock mechanics, etc.), adjust borehole assembly dynamics model parameters, generate drilling status charts, waypoints, a desired borehole path, an estimated borehole path, and/or to perform other tasks. In at least some embodiments, the directional drilling performed by the bottom hole assembly 350 is based on information transmitted to the bottom hole assembly 350 via downlink telemetry methods described herein.

The drilling system 300 may include a controller 352 that may instruct or steer the bottom hole assembly 350 as the drill bit 314 extends the wellbore 346 along a desired path 349 (e.g., within one or more boundaries 340). The controller 352 may include processors, sensors, and other hardware/software such as a rotary steerable system (RSS). In operation, controller 352 may apply a force to flex or bend a drilling shaft coupled to bottom hole assembly 350 thereby imparting an angular deviation to a current the direction traversed by drill bit 314 or the controller 352 may appropriately actuate pads in an RSS to steer in desired direction.

The controller 352 may communicate data with one or more components of bottom hole assembly 350 and/or surface equipment. In this fashion, controller 352 may analyze data and generate steering signals based on the signaling described here. While controller 352 is shown and described as a single component that operates for a particular type of directional drilling, the controller 352 may include any number of subsystem-components that collectively communicate and operate to perform the above discussed functions. The controller 352 represents an example component, which may further include various other types of steering mechanisms as well—e.g., steering vanes, a bent subsystem, and more. The environment shown in FIG. 3 is provided for purposes of discussion only, not for purposes of limitation. The detection tools, drilling devices, and signaling techniques discussed herein may be suitable in any number of drilling environments.

Figure 4:
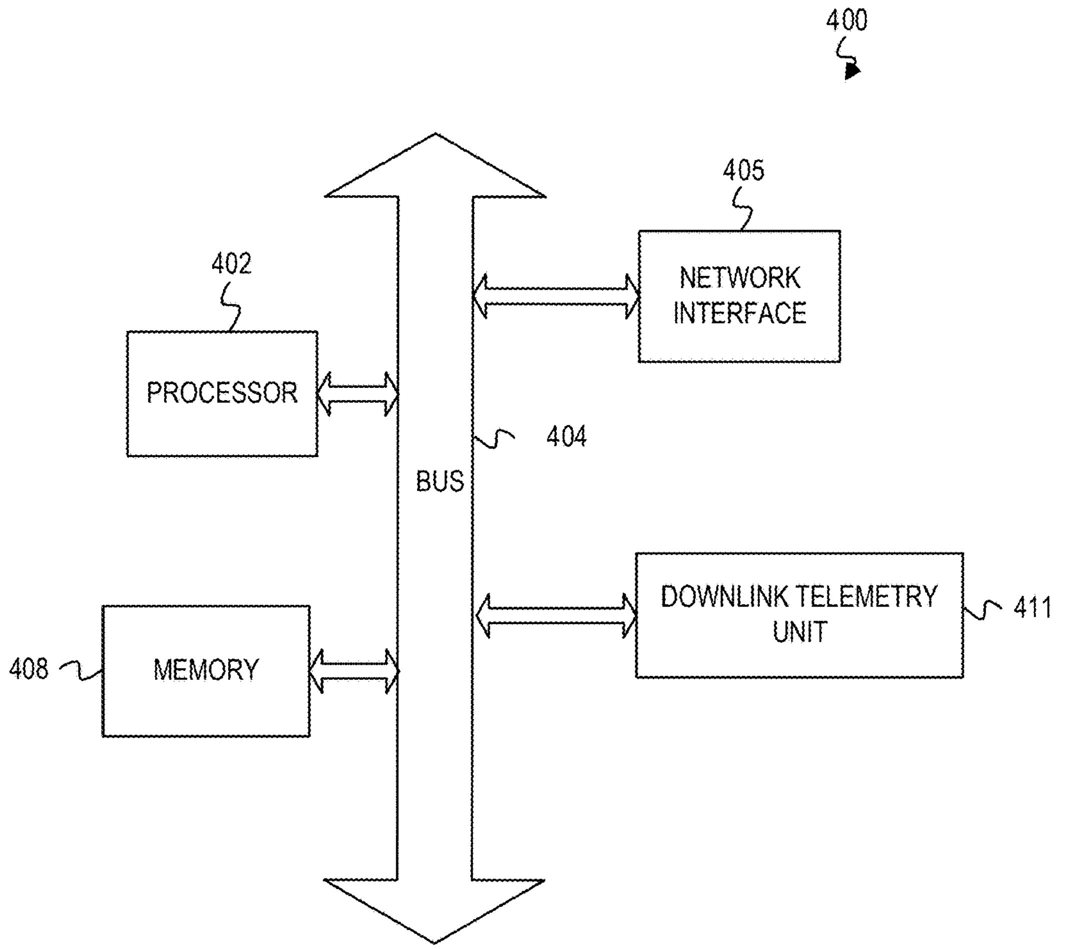
FIG. 4 is a block diagram illustrating a computing device for controlling downlink communications in a drilling system.

FIG. 4 is a block diagram illustrating a computing device for controlling downlink communications in a drilling system. For example, the computer system 400 may be used for transmitting downlink communications from the surface to one or more tools in a borehole. The downlink communications may include drilling parameters (e.g., drilling speed information, drilling direction information, etc.), changes to telemetry modes, and any other suitable information for downhole tools.

In FIG. 4, the computer system 400 may include one or more processors 402 connected to a system bus 404. The system bus 404 may be connected to a network interface 405 memory 408. The network interface 405 may utilize any suitable communication technology to facilitate communications to and from the computer system 400. The memory 408 may include any suitable memory random access memory (RAM), non-volatile memory (e.g., magnetic memory device), and/or any device for storing information and instructions executable by the processor(s) 402. In some implementations, the computer system 400 may include additional peripheral devices. For example, in some implementations, the computer system 400 may include multiple external multiple processors. In some implementations, any of the components may be integrated or subdivided.

The computer system 400 also may include a downlink telemetry unit 411. The downlink telemetry unit 411 may perform any suitable operations for encoding information for downlink transmission to tools of a drilling system. For example, the downlink telemetry unit 411 may perform operations for encoding information as described with reference to FIGS. 1, 2, 5, and 6. The downlink telemetry unit 411 may encode information for transmission outside the drilling system. The downlink telemetry unit 411 may be communicatively connected with any component of the drilling system and may transmit and receive information from any component of the drilling system (such as a mud system, rotary tools, and others). For example, the downlink telemetry unit 411 also may interact with a drive system that rotates rotary tools (such as the top drive 406), a mud pumping system that powers a downhole generator turbine (such as pump 420), a negative pressure system that controls valves to generate negative pressure pulses in the mud pumping system (such as valves 433), etc. The downlink telemetry unit 411 may use this information in performing operations for encoding information. For example, the downlink telemetry unit 411 may receive RPM information indicating RPMs of a rotary tool, where the downlink telemetry unit 411 may use the RPM information to encode information for transmission downhole to a downhole tool of the drilling system (as described herein).

Any component of the computer system 400 may be implemented as hardware, firmware, and/or machine-readable media including computer-executable instructions for performing the operations described herein. For example, some implementations include one or more non-transitory machine-readable media including computer-executable instructions including program code configured to perform functionality described herein. Machine-readable media includes any mechanism that provides (e.g., stores and/or transmits) information in a form readable by a machine (e.g., a computer system). For example, tangible machine-readable media includes read only memory (ROM), random access memory (RAM), magnetic disk storage media, optical storage media, flash memory machines, etc. Machine-readable media also includes any media suitable for transmitting software over a network.

Methods of Some Implementations

Figure 5:
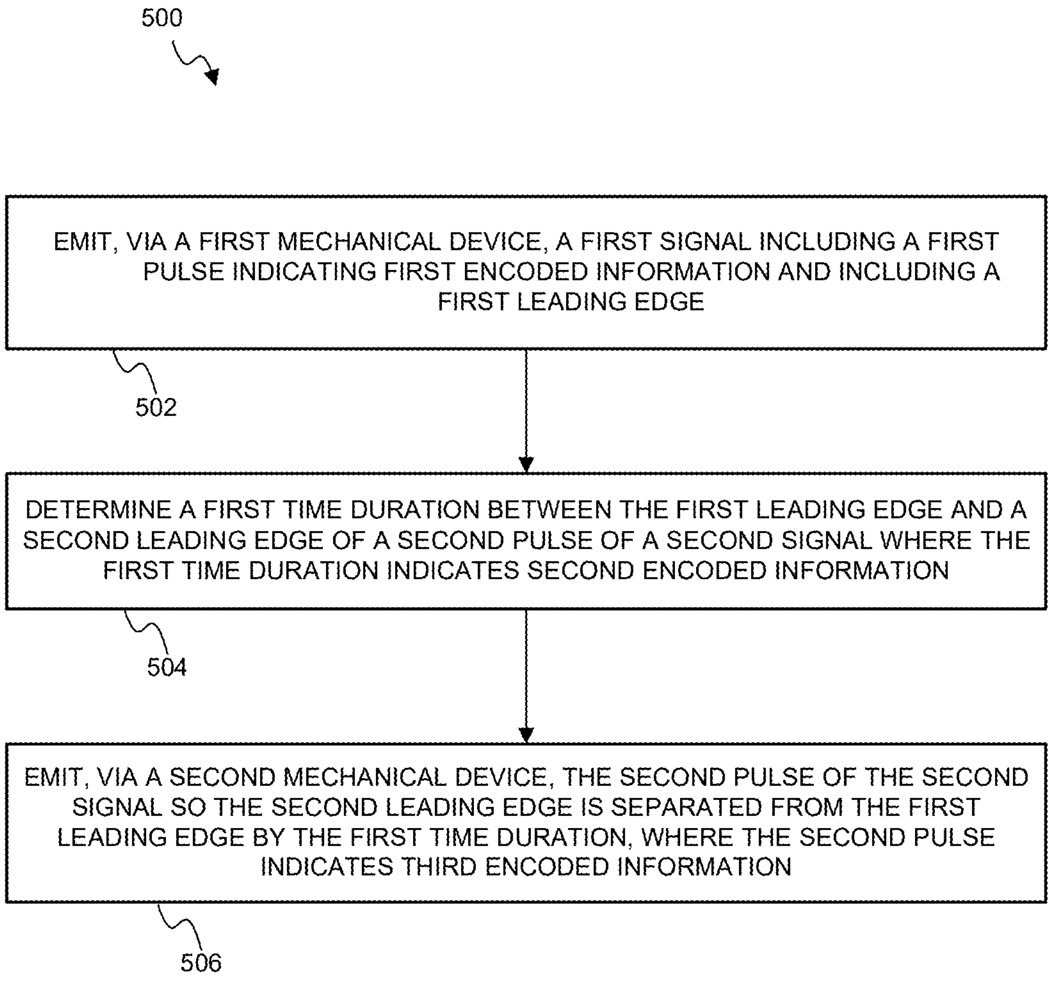
FIG. 5 is a flow diagram illustrating operations for transmitting encoded information to one or more downhole components.

FIG. 5 is a flow diagram illustrating operations for transmitting encoded information to one or more downhole components. In FIG. 5, a flow 500 again at block 502.

At block 502, a first device (such as a mechanical device) emits a first signal including a first pulse that includes a first leading edge, where the first pulse indicates first encoded information. The first encoded information may include drilling parameters (e.g., drilling speed, drilling direction, etc.), telemetry modes, and/or any other information useful by any of the downhole components. Flow continues at block 504.

At block 504, a computing device (such as the computer system 400) determines a first time duration between the first leading edge and a second leading edge of a second of a second signal, where the first time duration indicates second encoded information. The second encoded information may include drilling parameters (e.g., drilling speed, drilling direction, etc.), telemetry modes, and/or any other information useful by downhole components. Flow continues at block 506.

At block 506, a second device (such as a mechanical device) emits the second pulse of the second signal so the second leading edge is separated from the first leading edge by the first time duration, where the second pulse indicates third encoded information. The third encoded information may include drilling parameters (e.g., drilling speed, drilling direction, etc.), telemetry modes, and/or any other information useful by downhole components etc.

Figure 6:
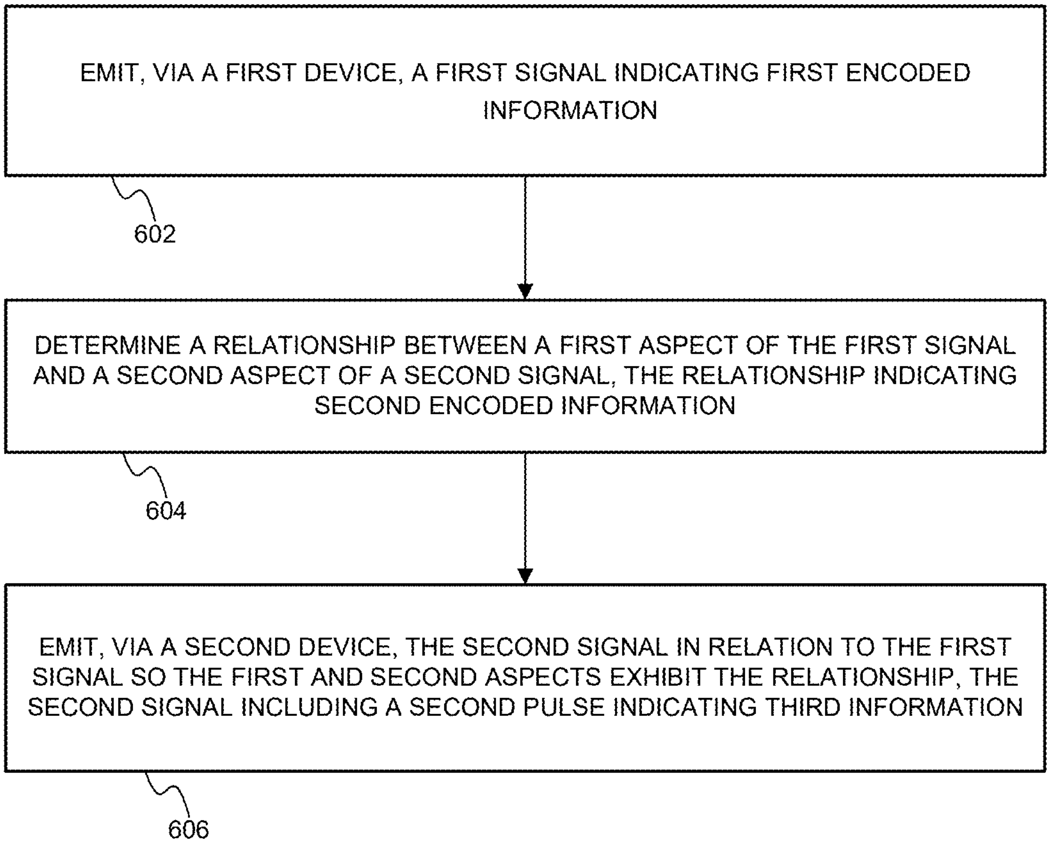
FIG. 6 is a flow diagram illustrating operations for transmitting encoded information to one or more downhole components.

FIG. 6 is a flow diagram illustrating operations for transmitting encoded information to one or more downhole components. In FIG. 6, flow 600 begins at block 602.

At block 602, a first device (such as a drilling fluid valve, rotary motor at the surface, etc.) emits a first signal indicating first encoded information. The first encoded information may include drilling parameters, modes, and/or any other information useful by downhole components. Flow continues at block 604.

At block 604, a computing device (such as the computer system 400) determines a relationship between the first aspect of the first signal and the second aspect of a second signal, where the relationship indicates second encoded information. In some implementations, the first and second aspects are leading edges of pulses in the first and second signals. In some implementations, the first and second aspects are amplitudes of the first and second signals. The second encoded information may include drilling parameters, modes, and/or any other information useful by downhole components. Flow continues at block 606.

At block 606, a second device (such as drilling fluid valve, a rotary motor at the surface, or a downhole turbine generator) emits the second signal in relation to the first signal so the first and second aspects exhibit the relationship, where the second signal includes a second pulse indicating third encoded information. The third encoded information may include drilling parameters, telemetry modes, and/or any other information useful by downhole components. From block 606, flow ends.

In some implementations, the drilling system may utilize the encoded information that is transmitted via the downlink techniques described herein to modify and/or perform drilling operations. For example, the drilling system 300 may modify and/or perform a drilling operation based on encoded information received via the downlinking methodologies described herein.

General Comments

FIGS. 1-6 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that may be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures and indicate relative positions corresponding to the orientation of the Figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

Example Clauses

Some implementations may include the following clauses.

Clause 1: A method for transmitting encoded information via operations of drilling equipment in a drilling system, the method comprising: emitting, via a first device, a first signal indicating first encoded information; determining a relationship between a first aspect of the first signal and a second aspect of a second signal, the relationship indicating second encoded information; and emitting, via a second device, the second signal in relation to the first signal so the first and second aspects exhibit the relationship.

Clause 2: The method of clause 1, wherein the second signal including a third aspect indicating third encoded information.

Clause 3: The method of any one or more of clauses 1-3, wherein the first aspect of the first signal is a first leading edge of the first signal and the second aspect of the second signal is a second leading edge of the second signal, and wherein the relationship is a time duration between the first and second leading edges.

Clause 4: The method of any one or more of clauses 1-3, wherein the first device includes a mud pump at the surface and the second device includes a rotary tool powered by a rotary table at the surface.

Clause 5: The method of any one or more of clauses 1-4, wherein the first signal is a negative pressure pulse from a drilling fluid pump and the second signal is a downhole measurement indicative of a revolutions per minute (RPM) of a rotary motor at the surface.

Clause 6: The method of any one or more of clauses 1-5, wherein the first signal is a negative pressure pulse from a drilling fluid pump and the second signal is a downhole measurement indicative of a revolutions per minute (RPM) of a rotary motor at the surface.

Clause 7: The method of any one or more of clauses 1-6, wherein the first aspect of the first signal is an amplitude of a first signal and the second aspect of the second signal is an amplitude of a second signal, and wherein the relationship is ratio of the amplitudes of the first and second signals.

Clause 8: A method for transmitting encoded information via operations of drilling equipment in a drilling system, the method comprising: emitting, via a first device, a first signal including a first pulse that includes a first leading edge, wherein the first pulse indicates first encoded information and; determining a first time duration between the first leading edge and a second leading edge of a second pulse of a second signal, wherein the first time duration indicates second encoded information; and emitting, via a second device, the second pulse of the second signal so the second leading edge is separated from the first leading edge by the first time duration, wherein the second pulse indicates third encoded information.

Clause 9: The method of clause 8 further comprising: determining a second time duration between the first leading edge of the first signal and a third leading edge of a third pulse of a third signal, wherein the second time duration indicates fourth encoded information; and emitting, via a third device, the third signal so the third leading edge is separated from the first leading edge, wherein the third pulse indicates fifth encoded information.

Clause 10: The method of any one or more of clauses 8-9, wherein the third signal includes a fourth pulse indicating a fourth encoded information without relation to the first signal.

Clause 11: The method of any one or more of clauses 8-10, wherein each of the first device and the second device include at least one component selected from the group consisting of: a valve, a mud pump, an electromagnetic antenna, and a rotary table.

Clause 12: The method of any one or more of clauses 8-11, wherein the first pulse indicates a negative pressure of mud flow in a borehole and the second pulse is a change in revolutions per minute of a downhole rotary tool.

Clause 13: The method of any one or more of clauses 8-12 further comprising performing a drilling operation in a borehole based on the third encoded information Clause 14: The method of any one or more of clauses 8-13 further comprising: decoding, via a third downhole device, the second encoded information based on the first time duration between the first leading edge and the second leading edge Clause 15: The method of any one or more of clauses 8-14, wherein the first encoded information is encoded via differential pulse position modulation (DPPM) of flowing mud and the second encoded information is encoded via pulse width modulation of revolutions per minute of a rotating tool.

Clause 16: The method of any one or more of clauses 8-15, wherein the first downhole device and the second downhole device are mechanical devices.

Clause 17: A method for transmitting encoded information via operations of drilling equipment in a drilling system, the method comprising: emitting, via a first device of the drilling system, a first signal with a first aspect indicative of a first encoded information; emitting, via a second device of the drilling system, a second signal with a second aspect indicative of a second encoded information, wherein the emission of the second signal is performed in relationship to the first signal, and wherein a relationship between the first signal and the second signal indicates a third encoded information.

Clause 18: The method of clause 17, wherein the first aspect of the first signal is a first leading edge of the first signal and the second aspect of the second signal is a second leading edge of the second signal, and wherein the relationship between the first and second signals is a time duration between the first and second leading edges.

Clause 19: The method of any one or more of clauses 17-18, wherein the first device and the second device are mechanical devices.

Clause 20: The method of any one or more of clauses 17-19 further comprising: decoding, via a third device, the first encoded information based on the first aspect of the first signal; decoding, via the third device, the second encoded information based on the second aspect of the first signal;

and decoding, via the third device, the third encoded information based on a relationship between the first signal and the second signal.

What is claimed is:

1. A method for transmitting encoded information via operations of drilling equipment in a drilling system, the method comprising:

emitting, via a first device, a first signal indicating first encoded information;

determining a relationship between a first aspect of the first signal and a second aspect of a second signal, the relationship indicating second encoded information comprising a portion of a data stream having information values independent of information values encoded in the first and second signals; and emitting, via a second device, the second signal in relation to the first signal so the first and second aspects exhibit the relationship, wherein the first aspect of the first signal is a first leading edge of the first signal and the second aspect of the second signal is a second leading edge of the second signal, and wherein the relationship is a time duration between the first and second leading edges.

2. The method of claim 1, the second signal including a third aspect indicating third encoded information.

3. The method of claim 1, wherein the first device includes a mud pump at a surface and the second device includes a rotary tool powered by a rotary table at the surface.

4. The method of claim 1, wherein the first signal is a negative pressure pulse from a drilling fluid pump and the second signal is a downhole measurement indicative of a revolutions per minute (RPM) of a rotary motor at a surface.

5. The method of claim 1, wherein the first signal is an electromagnetic signal and wherein the second signal is pulses selected from a group consisting of a negative pressure pulse from a drilling fluid system, RPM pulses generated by a rotating force at a surface, and RPM pulses generated by a downhole generator turbine.

6. A method for transmitting encoded information via operations of drilling equipment in a drilling system, the method comprising:

emitting, via a first device, a first signal including a first pulse that includes a first leading edge, wherein the first pulse indicates first encoded information and;

determining a first time duration between the first leading edge and a second leading edge of a second pulse of a second signal, wherein the first time duration indicates second encoded information comprising a portion of a data stream having information values independent of information values encoded in the first and second signals; and emitting, via a second device, the second pulse of the second signal so the second leading edge is separated from the first leading edge by the first time duration, wherein the second pulse indicates third encoded information.

7. The method of claim 6 further comprising:

determining a second time duration between the first leading edge of the first signal and a third leading edge of a third pulse of a third signal, wherein the second time duration indicates fourth encoded information; and emitting, via a third device, the third signal so the third leading edge is separated from the first leading edge, wherein the third pulse indicates fifth encoded information.

8. The method of claim 7, wherein the third signal includes a fourth pulse indicating a fourth encoded information without relation to the first signal.

9. The method of claim 6, wherein each of the first device and the second device include at least one component selected from a group consisting of: a valve, a mud pump, an electromagnetic antenna, and a rotary table.

10. The method of claim 6, wherein the first pulse indicates a negative pressure of mud flow in a borehole and the second pulse is a change in revolutions per minute of a downhole rotary tool.

11. The method of claim 6 further comprising:

performing a drilling operation in a borehole based on the third encoded information.

12. The method of claim 6 further comprising:

decoding, via a third downhole device, the second encoded information based on the first time duration between the first leading edge and the second leading edge.

13. The method of claim 6, where the first encoded information is encoded via differential pulse position modulation (DPPM) of flowing mud and the second encoded information is encoded via pulse width modulation of revolutions per minute of a rotating tool.

14. The method of claim 6, wherein the first device and the second device are mechanical devices.

15. A method for transmitting encoded information via operations of drilling equipment in a drilling system, the method comprising:

emitting, via a first device of the drilling system, a first signal with a first aspect indicative of a first encoded information; and emitting, via a second device of the drilling system, a second signal with a second aspect indicative of a second encoded information, wherein the emission of the second signal is performed in a relationship to the first signal, and wherein the relationship between the first signal and the second signal indicates a third encoded information comprising a portion of a data stream having information values independent of information values encoded in the first and second signals, wherein the first aspect of the first signal is a first leading edge of the first signal and the second aspect of the second signal is a second leading edge of the second signal, and wherein the relationship between the first and second signals is a time duration between the first and second leading edges.

16. The method of claim 15, wherein the first device and the second device are mechanical devices.

17. The method of claim 15 further comprising:

decoding, via a third device, the first encoded information based on the first aspect of the first signal;

decoding, via the third device, the second encoded information based on the second aspect of the second signal; and decoding, via the third device, the third encoded information based on the relationship between the first signal and the second signal.

* * * * *